R. LIVINGSTON.
TIRE TRACTION DEVICE.
APPLICATION FILED APR. 24, 1909.
1,042,016.
Patented Oct. 22, 1912.
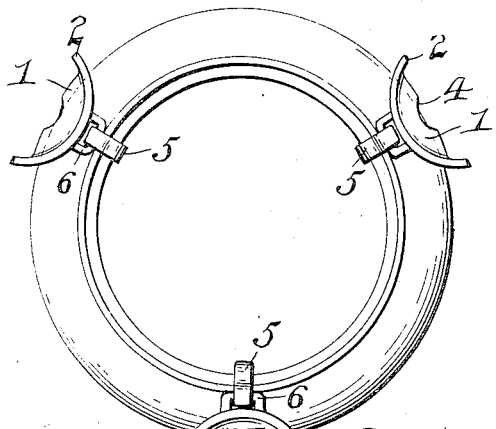
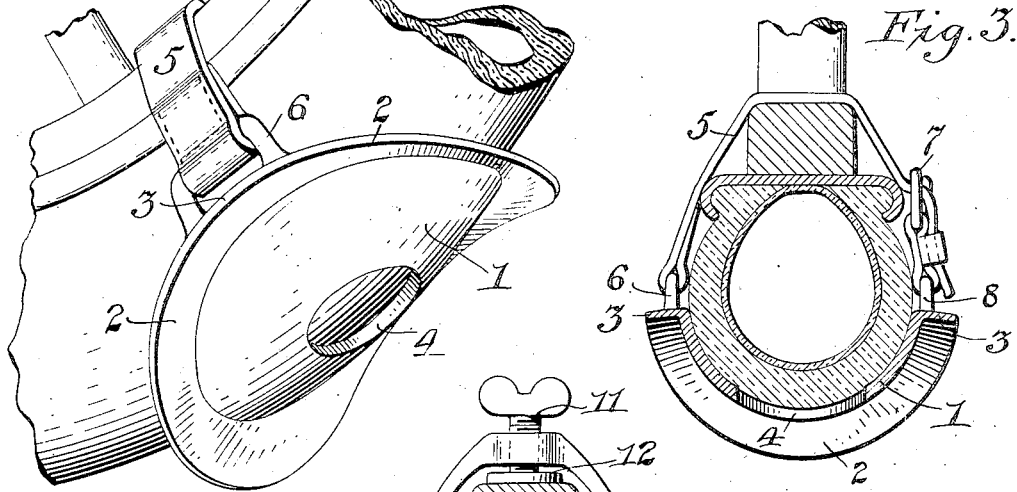
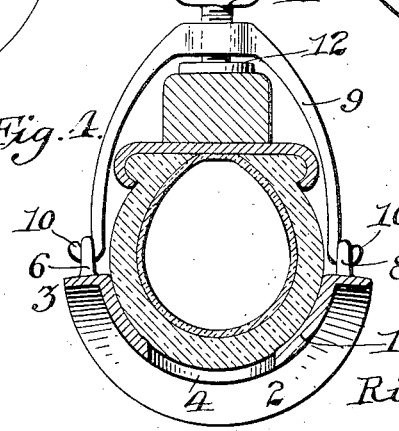
Witnesses
E. H. Lewis
Frank Severance
Inventor
Richard Livingston,
By Cassell Severance,
his Attorney.

UNITED STATES PATENT OFFICE.

RICHARD LIVINGSTON, OF LOS ANGELES, CALIFORNIA.

TIRE TRACTION DEVICE.

1,042,016.　　　　Specification of Letters Patent.　　Patented Oct. 22, 1912.

Application filed April 24, 1909. Serial No. 491,888.

*To all whom it may concern:*

Be it known that I, RICHARD LIVINGSTON, a citizen of the United States, residing at Los Angeles, in the county of Los Angeles and State of California, have invented certain new and useful Improvements in Tire Traction Devices, of which the following is a specification.

This invention relates to improvements in traction devices for wheels and is more particularly adapted to the propelling wheels of power driven vehicles, such as automobiles.

It is the object of the invention to provide a traction device that can be easily and quickly applied to the tread of a vehicle wheel and which will give the said wheel the proper traction when traveling over loose or yielding surfaces, as for instance, sand, gravel or the like.

With this and other objects in view, the invention comprises certain novel constructions, combinations and arrangements of parts as will be hereinafter fully described and claimed.

In the accompanying drawing forming a part of this specification:—Figure 1 is a side elevation of the rim portion of a wheel showing the improved traction device applied thereto at several points. Fig. 2 is an enlarged perspective view of the traction device applied to the tire of an automobile wheel, a portion only of said wheel being shown. Fig. 3 is a central vertical sectional view, taken through the traction device just to one side of its securing strap, the section also passing through the rim portion of an automobile wheel. Fig. 4 is a similar sectional view but showing a different securing means for holding the traction device in place.

The traction device forming the subject matter of the present invention is adapted for use on all kinds of vehicle wheels but is particularly useful when applied to the propelling wheels of automobiles, motor-cycles, bicycles or the like and as it is especially useful in connection with such kinds of wheels as are employed on these mechanisms, the device has been illustrated in the drawing as applied to an automobile wheel. As shown in the drawing, the traction device embraces a plate 1 which is curved so as to fit nicely upon the tread of the wheel tire. The plate 1 is provided with a propelling flange 2, which projects from said plate in such a manner as to obtain a hold upon the ground so that the wheel will not slip thereon, the said flange also preventing the tire from sinking into the sand or loose soil to any great depth. For securing this result, the flange 2 is made to extend outwardly from the edge of the plate 1 at a considerable angle to the tread of the wheel, though the flange is preferably not extended quite at right angles to the tread. Of course it will be understood that it is not necessary to make the flange at a given angle to the body portion of the plate to be within the spirit of the invention, for the invention contemplates all angles that are sufficient to give the flange a good hold upon the ground that is to be covered. The flange 2 extends almost laterally from the side edges of the plate 1, as at 3 so that the said flange is well adapted for resisting any tendency of the wheel to sink into soft or loose surfaces. The plate 1 is also preferably provided with an aperture as 4 which serves not only to lighten the structure, but because of the yielding character of inflated tires to which the device is generally applied, to give a better hold upon said tire. The rubber of the tire will bulge to some extent into said opening and prevent the slipping of the plate thereon. The plate may be applied to the tire in various ways, but I preferably use means of a simple character and such as can be easily and quickly manipulated for putting the traction device on a wheel or removing it therefrom.

As shown in the drawing, in Figs. 1, 2 and 3, I generally use a strap 5 which is secured to an eye or loop 6 formed upon one side of the plate and which engages a buckle 7 secured to a loop or eye 8 formed upon the other side of the plate. The strap is passed around the rim and felly of the wheel and drawn up in the buckle until the plate is firmly held to the tread of the wheel. It will be seen that this means for securing the traction device makes it possible to put on or take off the said device at any time with very little trouble. As shown in Fig. 4, I also contemplate using a clamping yoke as 9 for securing the plate to the tire. In this instance, the hooked ends 10 of the yoke 9, are sprung into engagement with the loops 6 and 8 of the traction plate and a thumb screw 11 carried by the yoke and having a head or bearing plate 12 for engaging the felly of the wheel, is operated for tightening the yoke in position and thus drawing the traction plate against the tire.

It will be apparent that the traction plate can be made with flanges of any desired projection. If the device is to be used in very sandy country, the flange should be of considerable width, so as to prevent the possibility of any shpping of the wheel when propelling the vehicle. In firmer ground, it may be well to provide the plate with less prominent flanges. The device is especially useful in desert travel and need only be applied to the wheels of the vehicle when sandy stretches of country are encountered. Thus when traveling upon the hard paved streets of a city, the traction plate or plates can be readily taken from the wheels and kept for use when passing out into the country where soft or sandy stretches are to be encountered. At such a time it will require only a few minutes to strap one, two, three or more traction plates to the propelling wheels so as to be able to make good progress in driving the vehicle.

Of course it should be understood that the shape of the plate can be varied so as to fit different sizes and shapes of wheels and the propelling flange may be of various widths and set at different angles, without departing in the least from the spirit of the invention.

Having now described the invention what is claimed and desired to be secured by Letters Patent, is:—

1. A detachable traction shoe for vehicles, comprising a tread-plate curved to fit the ground-engaging portion of a tire, said plate having a peripheral flange extending along its edge and turned outwardly, so as to extend in approximately radial position transversely of the tire tread and approximately in horizontal position at the sides of the tire, and attaching means adapted to extend around the tire of a wheel for holding said traction plate at any desired point upon the tire.

2. A detachable traction shoe for vehicles, comprising a tread plate curved to fit the ground-engaging portion of a tire and having a central opening through which the tire may slightly bulge, the plate having a peripheral flange extending entirely around its edge and turned outwardly so as to extend in approximately radial position transversely of the tire tread and approximately in horizontal position at the sides of the tire, and attaching means adapted to be extended around the felly of a wheel for holding the said traction plate at any desired point upon a tire.

In testimony whereof, I have hereunto set my hand, in presence of two witnesses.

RICHARD LIVINGSTON.

Witnesses:
EDNA B. ROLLINS,
CASSELL SEVERANCE.